United States Patent [19]

Karlsson et al.

[11] Patent Number: 5,259,356
[45] Date of Patent: Nov. 9, 1993

[54] DEVICE AT INTERNAL COMBUSTION ENGINE WITH FUEL INJECTION

[75] Inventors: Jan Karlsson, Västra Frölunda; Jan Dahlgren, Göteborg; Erling Tyllström, Kungsbacka, all of Sweden

[73] Assignee: AB Volvo, Gothenburg, Sweden

[21] Appl. No.: 910,693

[22] Filed: Jul. 8, 1992

[30] Foreign Application Priority Data

Jul. 8, 1991 [SE] Sweden .............................. 9102125

[51] Int. Cl.⁵ .............................................. F02M 31/20
[52] U.S. Cl. .................................... 123/541; 123/52 M
[58] Field of Search ............ 123/52 M, 52 MB, 52 MC, 123/52 MV, 541, 41.31

[56] References Cited

U.S. PATENT DOCUMENTS

| | | | |
|---|---|---|---|
| 4,519,354 | 5/1985 | Katoh et al. | 123/541 |
| 4,773,473 | 9/1988 | Konitzo | 123/541 |
| 4,924,838 | 5/1990 | McCandless | 123/541 |
| 5,094,194 | 3/1992 | Rush et al. | 123/52 M |
| 5,094,217 | 3/1992 | Kaku et al. | 123/41.31 |
| 5,156,134 | 10/1992 | Tochizawa | 123/541 |

FOREIGN PATENT DOCUMENTS

| | | | |
|---|---|---|---|
| 3644552 | 7/1988 | Fed. Rep. of Germany | 123/541 |
| 0224447 | 9/1989 | Japan | 123/541 |

*Primary Examiner*—David A. Okonsky
*Attorney, Agent, or Firm*—Merchant & Gould, Smith, Edell, Welter & Schmidt

[57] ABSTRACT

A device at air filters of intake systems of internal combustion engines with fuel injection. The fuel pipe (21) is to a part of its length positioned in the air filter air space (14) of the housing (10), whereby a cooling of the fuel supplied is obtained.

2 Claims, 2 Drawing Sheets

DEVICE AT INTERNAL COMBUSTION ENGINE WITH FUEL INJECTION

TECHNICAL FIELD

The present invention refers to a device at air filters for intake systems of internal combustion engines.

BACKGROUND OF THE INVENTION

All internal combustion engines have an air cleaner for the engine air intake. The main function of the air cleaner is to keep away dust and other particles from the carburettor and the cylinders. The air filter prevents dust or dirt from blocking jets and causing wear on pistons and cylinders. The cleaner also functions as a silencer, as it muffles the intake noise from the carburettor and the air cleaner housing suppresses the resonance which occurs due to the air pressure variations in the induction pipe.

OBJECT OF THE INVENTION AND MOST IMPORTANT FEATURES

The object of the present invention is to achieve an intake system of the type mentioned in the introduction, which exhibits a compact and space-saving construction and which is particularly adapted to internal combustion engines with direct fuel injection. This has according to the invention been achieved in that the fuel pipe to a part of its length is positioned in the air space of the air filter housing, whereby a cooling is obtained of the fuel supplied.

DESCRIPTION OF THE DRAWINGS

Hereinafter the invention will be further described with reference to an embodiment shown in the enclosed drawings.

DESCRIPTION OF EMBODIMENT

Figure 1:
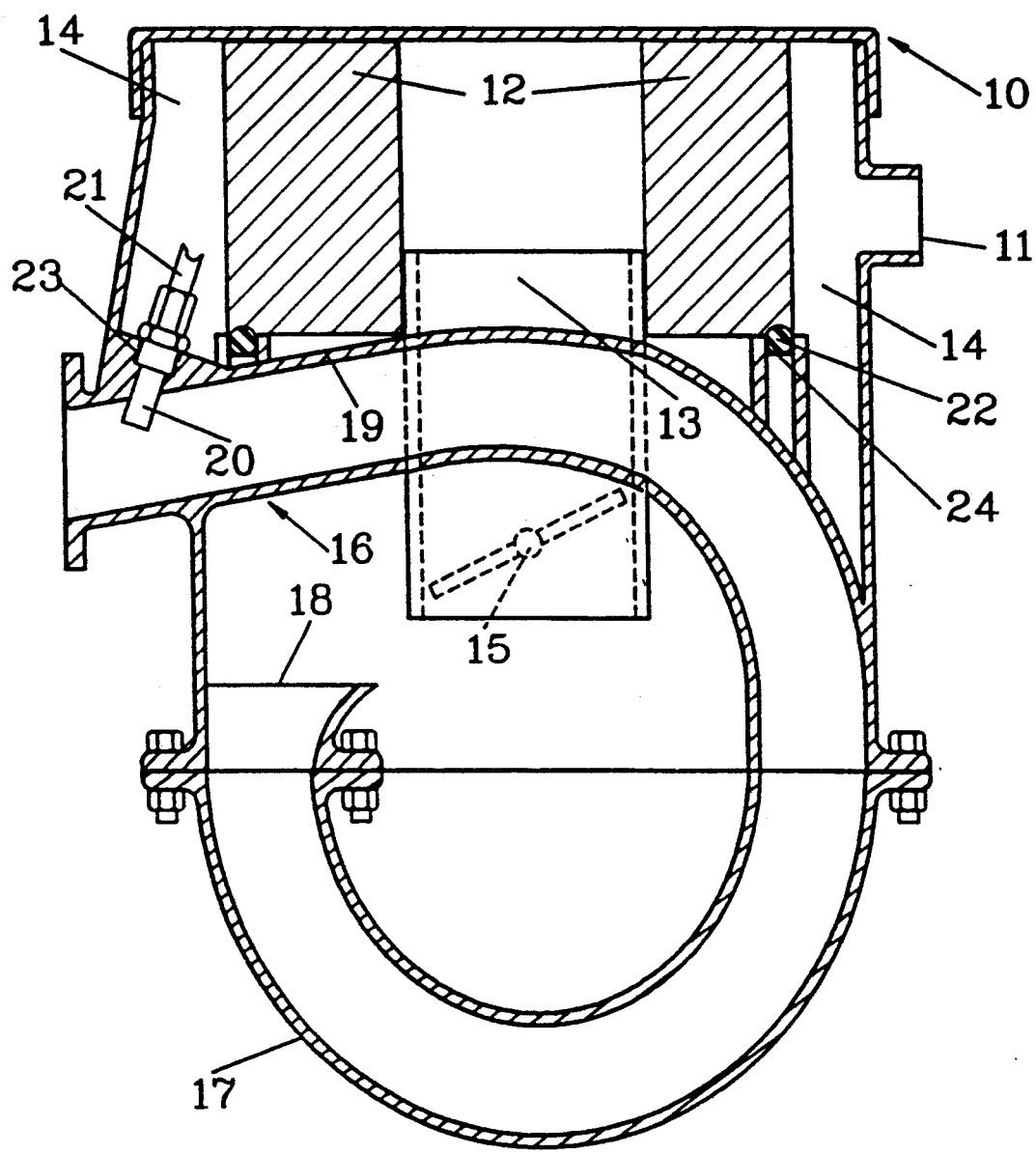
FIG. 1 discloses a section through the intake system.

The intake system according to FIG. 1 includes a filter housing 10 with an air intake 11, a filter element 12 and at least one air outlet tube 13. The filter housing 10 encases the replaceable, tubular filter element 12. The air intake 11 is placed at one gable of the filter housing 10 whereas the outlet tube 13 is connected to the tubular opening of the filter element 12. From the air intake 11 the air is led via an air space 14 extending around the filter element through the filter element 12 and to the air outlet tube.

The outlet tube 13 comprises a throttle valve 15 and ends into a common space from where the induction air is distributed to the inlet manifolds 16 of the different engine cylinders. The inlet part 17 of these inlet manifolds 16 is horn-shaped and has an inlet opening 18, which communicates with the outlet tube 13, from where the induction air is led on to the inlet manifolds 16 via an air room in the horn 17. The inlet manifold has an upper mainly plane portion 19, against which a part of the filter housing 10 connects and it thus forms a part of its lower border. A very compact and space-saving construction is hereby achieved.

Figure 2:
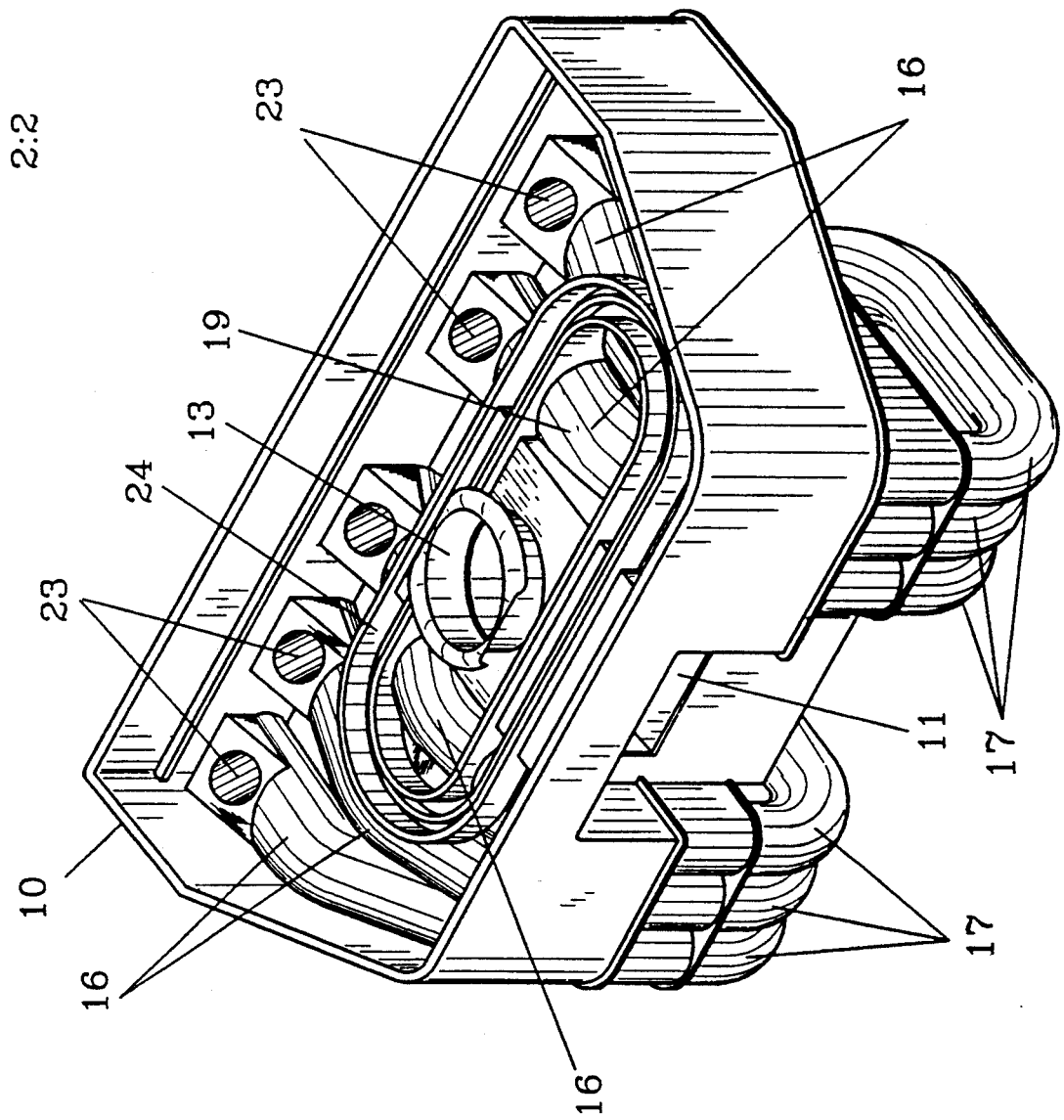
FIG. 2 discloses in perspective the intake system according to the invention without filter, and without fuel injection valve.

In FIG. 2 is shown an intake system for a six cylinder engine, with equal number of inlet manifolds 16. The outlet tube 13 from the filter housing 10 is centrally located and the air is distributed from this point to all six inlet manifolds 16. Thus the filter element 12 (not shown) is positioned direct on the package forming the intake system, whereby the upper portion 19 of the inlet manifold 16 forms the bottom of the filter housing. The portion 19 of the inlet manifolds 16 connecting to the filter housing 10 are curved but may also be plane, whereby the filter housing 10 is given a corresponding design.

The filter element 12 itself is positioned against a sealing ring 22 in a groove 24, which has a shape corresponding to the cross section of the filter element, which in the example shown is oval.

Fuel is supplied to the outlet part of the inlet manifold 16 via a fuel injection valve 20 which is screwed into a threaded bore 23 at the upper part of the inlet manifolds near the outlet end thereof. The fuel pipe 21 is positioned to a part of its length in the air space 14 of the filter housing 10, which air space communicates with the air intake 11. Hereby is achieved a cooling of the fuel supplied. Alternatively the supply pipe for the fuel can be embedded and form a unit with the induction pipe 16 and even in this case a part of the fuel pipe can be placed into the air space 14 of the filter housing 10.

The invention is of course not limited to the embodiment shown but several variants are conceivable within the scope of the claims.

What we claim is:

1. An air intake device for a combustion engine having a fuel supply pipe and associated fuel injector, an air intake manifold having an air induction passage, a filter housing atop thereof, the improvement characterized in that a portion of the fuel supply pipe and at least one associated fuel injector extend into the said air induction passage so that the fuel in said pipe is cooled by air passing through said induction pipe.

2. A device according to claim 1 wherein said fuel supply pipe is embedded into and forms a unit with the induction pipe.

* * * * *